S. R. SMITH.
TELEGRAPH OR LIKE SYSTEM AND APPARATUS THEREFOR.
APPLICATION FILED FEB. 7, 1916.

1,280,570.

Patented Oct. 1, 1918.
5 SHEETS—SHEET 1.

S. R. SMITH.
TELEGRAPH OR LIKE SYSTEM AND APPARATUS THEREFOR.
APPLICATION FILED FEB. 7, 1916.

1,280,570.

Patented Oct. 1, 1918.
5 SHEETS—SHEET 2.

Inventor:
Sidney R. Smith,
by Wilkinson, Guesta & MacKaye
Attorneys

S. R. SMITH.
TELEGRAPH OR LIKE SYSTEM AND APPARATUS THEREFOR.
APPLICATION FILED FEB. 7, 1916.

1,280,570.

Patented Oct. 1, 1918.
5 SHEETS—SHEET 3.

S. R. SMITH.
TELEGRAPH OR LIKE SYSTEM AND APPARATUS THEREFOR.
APPLICATION FILED FEB. 7, 1916.

1,280,570.

Patented Oct. 1, 1918.
5 SHEETS—SHEET 5.

Inventor.
S. R. Smith.
by Wilkinson, Giusta & Mackaye
Attorneys.

UNITED STATES PATENT OFFICE.

SIDNEY REYNELL SMITH, OF LIVERPOOL, ENGLAND.

TELEGRAPH OR LIKE SYSTEM AND APPARATUS THEREFOR.

1,280,570.   Specification of Letters Patent.   Patented Oct. 1, 1918.

Application filed February 7, 1916. Serial No. 76,638.

*To all whom it may concern:*

Be it known that I, SIDNEY REYNELL SMITH, a subject of the King of Great Britain, residing at Liverpool, England, have invented certain new and useful Improvements in or Relating to Telegraph or like Systems and Apparatus Therefor, of which the following is a specification.

This invention relates to telegraph systems, and more particularly to signal storing and transmitting apparatus for use, for example, in keyboard printing telegraph systems.

The invention is further applicable to systems in which a single wire is or may be used for the transmission of more than one message at a time. One form of the invention will be described as applied, for example, to a system in which the different letters or characters are each transmitted by a permutation of a fixed number of positive and negative impulses. In systems of this character it has heretofore been the usual practice to employ at both the sending and receiving stations what are termed distributers moving in synchronism. These distributers have usually comprised a number of fixed contacts arranged in divisions or sets with a wiping conductor moving successively over the divisions in order to connect the contacts belonging to each keyboard at the sending station to the line at the same time that its corresponding apparatus at the receiving end is placed in condition to receive the signal. When, in such an arrangement, the keys of the keyboard are connected directly to or directly control the contacts in the distributer, the speed at which the keyboard may be operated is limited by the speed of the distributer because it is necessary for one signal to be transmitted before the keyboard is operated for the next. There have heretofore been employed certain storing means such as punched paper strips and the like on which the signals from the keyboard are recorded and then transmitted to the distributer at the proper speed independent of the speed of operation of the keyboard.

It is an object of this invention to provide certain improvements in the construction and operation of mechanically self-contained storers for this purpose and preferably to construct and arrange these storers in such a manner that the signals of a plurality of different messages may be transmitted to the line at the same time and in proper order, without the employment of a separate distributer.

In the embodiment of the invention described herein it is assumed that each telegraphic character to be transmitted is represented by a particular permutation of five negative and positive impulses. The depression of any key in the keyboard is instrumental in causing the corresponding signal to be set up on one of a plurality of groups of movable pins carried by a pair of constantly rotating disks. After a group of pins has been set it is carried past a set of impulse springs and determines the permutation of impulses to be sent to the line. The members for setting the pins are moved to a new group at each operation of the keyboard, and the keyboard may therefore be operated quite independently of the speed at which the characters are transmitted to the line since the speed of transmission is governed solely by the speed of rotation of the disks.

One form of the invention is illustrated in the accompanying drawings, of which

The construction and operation of the apparatus is as follows: Journaled in two standards 2 and 3, fixed to a base plate 4, is a rotatable shaft 5, to which are fixed near one end two disks 6 and 7. The disk 7 is provided on its circumference with gear teeth for gearing with a phonic wheel motor or other suitable source of power of constant speed. Carried by these disks are five concentric rows of pins 8 which are slidable in holes so as to be capable of occupying either of the two positions 8ª or 8ᵇ, Fig. 1. Position 8ª is the normal position.

Figure 4:
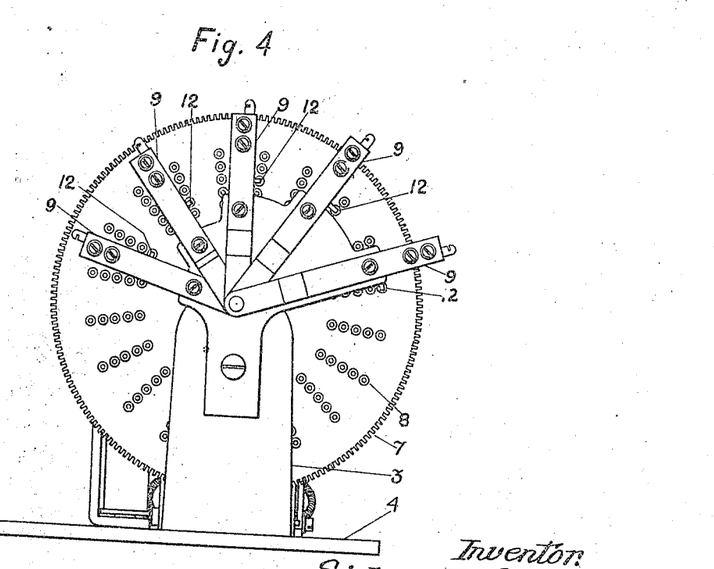
Fig. 4 is a left end elevation.

Fixed to the standard 3 are five radial arms 9 (Figs. 1, 2 and 4), each carrying at its outer end an electrically insulated contact screw 10 and a flexible contact spring 11. There is thus one pair of electrical contacts 10 and 11 for each circular row of pins, and if a pin is in its alternate position as shown at 8ᵇ Fig. 1 when it passes, it momentarily lifts the spring 11 into contact with the screw 10. Immediately after passing the spring 11 the end of the pin strikes the inclined end of a plate 12 and is forced back to normal position thereby. Pins that are in normal position as 8ª do not affect the springs 11 as they are carried past by the rotating disks.

Figure 5:
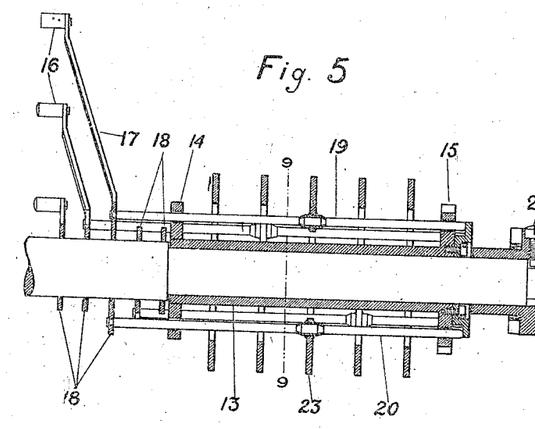
Fig. 5 is a partial sectional view on the line 5'—5' Fig. 1 to show more clearly the construction of the hammer carriage and parts related thereto.
Figure 6:
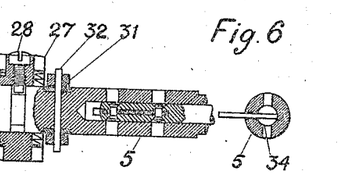
Fig. 6 is a sectional view of the main shaft on the line 6'—6' Fig. 1.

The means by which the setting of the pins is effected comprise five hammers carried by a carriage which is freely rotatable on the shaft 5. This carriage comprises a hollow shaft or tube 13 (Fig. 5) with end plates or flanges 14 and 15. Each hammer comprises a knob or head 16 carried by a bent arm 17 fixed to or forming an extension of an annular plate 18, which in turn is fixed to the end of two guide rods 19 and 20 passing loosely through holes in the end plates 14 and 15 of the hammer carriage. Between the plates 14 and 15 there is fixed to the rods 19 and 20 an annular plate 23, which lies adjacent to the end of the armature lever of an electromagnet 21. There is one hammer with its accompanying electromagnet for each circular row of pins. Each of the hammers is held in its normal position by a small spring 22 (Fig. 1) but, when its magnet is energized, the engagement of its armature lever with the plate 23 forces the hammer to the left, thereby shifting the pin before which it is standing from the position 8ª (Fig. 1) to the position 8ᵇ.

Figure 2:
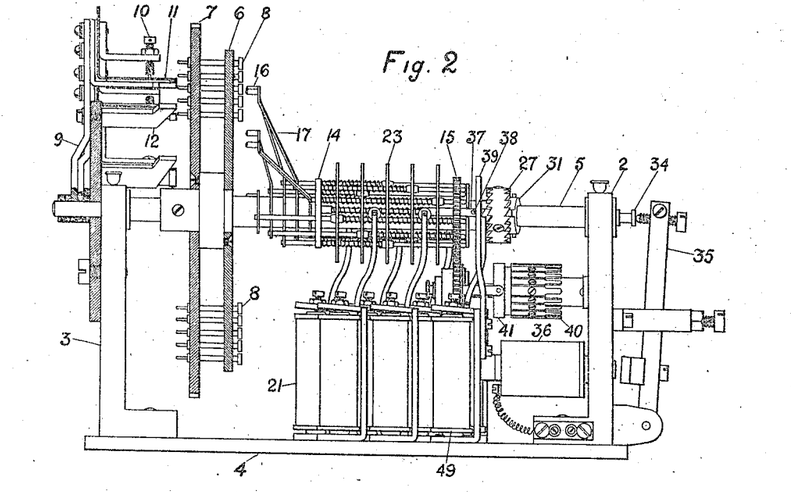
Figure 3:
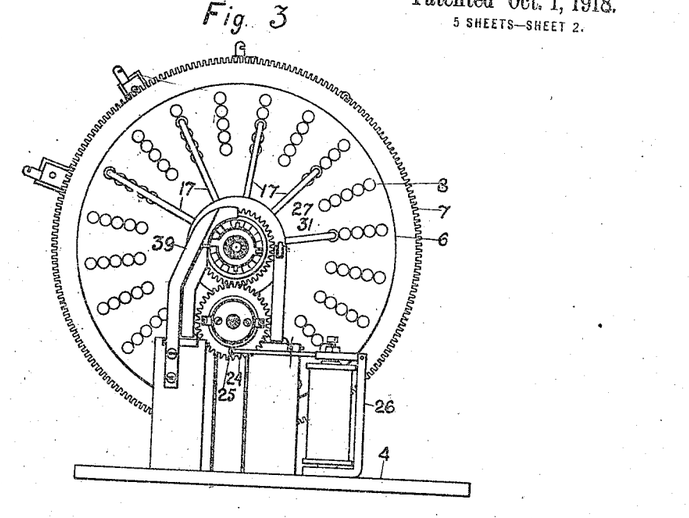
Fig. 3 is a sectional elevation on the line 3'—3' Fig. 1.
Figures 7, 8, 9:
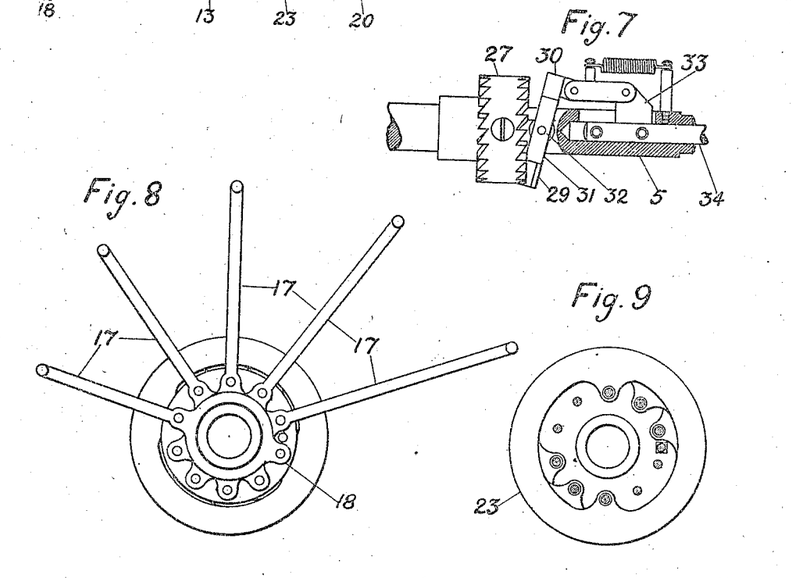
Fig. 7 is an enlarged detail view, partly in section, of the escapement mechanism.
Figs. 8 and 9 are detail views of portions of the hammer carriage.

In the idle condition of the apparatus the hammer carriage is de-clutched from the shaft and remains stationary riding idly thereon, but during the operation of the keyboard the carriage becomes clutched to the shaft and rotates therewith in a counter-clockwise direction as viewed in Fig. 3, but upon each operation of a key in the keyboard the carriage is stepped back one step in a clockwise direction around the shaft. The manner in which this is accomplished is as follows: Meshing with the gear teeth on the edge of the plate 15 is a gear wheel 24 (Fig. 3) which is connected with a spring which tends to rotate the hammer carriage in a clockwise direction, but is normally prevented from doing so by the engagement of the stop pin 25 with the armature lever of an electromagnet 26. Adjacent to the end of the hammer carriage and rotatably mounted on the shaft 5 is a scape ring or collar 27 (Figs. 5 and 7) which is prevented from endwise motion by the engagement of the end of the screw 29 with a circular key way in the shaft. Adjacent to one side of the scape ring is a scape lever comprising the two pallets 29 and 30 forming extensions from the ring 31, which is loosely mounted on a pin 32 and connected by a link 33 with a pin 34, which extends out through the end of the shaft and adjacent to the end of the armature 35 of the electromagnet 36. The hammer carriage is provided with a slidable pawl 37 (Fig. 2) which is normally held out of engagement with the teeth in the scape ring by the engagement of the pin 38 with the left hand face of the guide plate 39, which envelops approximately a quarter of the circumference of the shaft.

Before the beginning of each message the operator, by pressing a starting button on the keyboard energizes the starting magnet 26 which removes the end of its armature lever from the stop pin 25, thereby freeing the hammer carriage and permitting it to move under its spring tension in a clockwise direction, until its pawl disengages itself from the end of plate 39 whereupon the pawl slips into the teeth of the scape ring 27, thereby clutching the carriage with the shaft through the medium of the ring 27 and its scape lever. The hammer carriage now begins to rotate with the shaft in a counter-clockwise direction, but on each operation of a key in the keyboard the magnet 36 is energized operating the scape lever to permit the scape ring and hammer carriage to drop back one step in a clockwise direction.

Above the magnet 36 (Fig. 2) there is shown a stationary commutator device, comprising a number of segments 40 and a slip ring 41, engaged by a pair of short circuiting brushes carried by the gear wheel 24.

The construction of the apparatus having been explained, its mode of operation will now be described.

Figure 1:
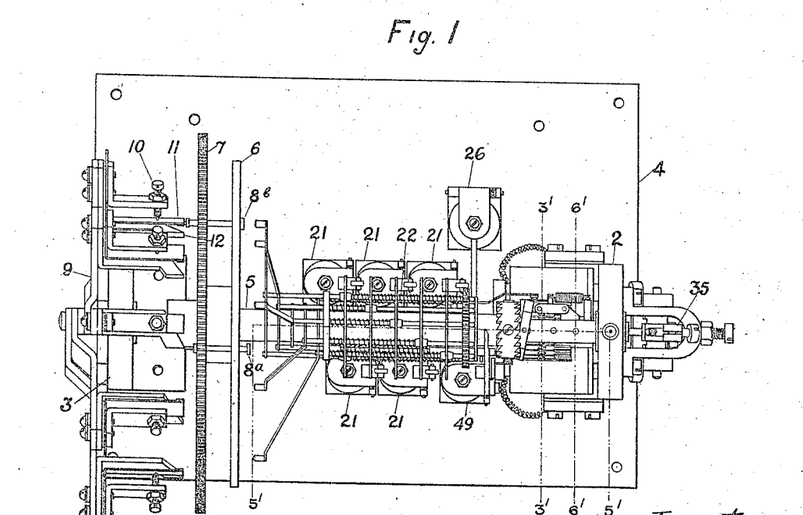
Figure 1 is a plan and Fig. 2 is an elevation partly in section.
Figure 10:
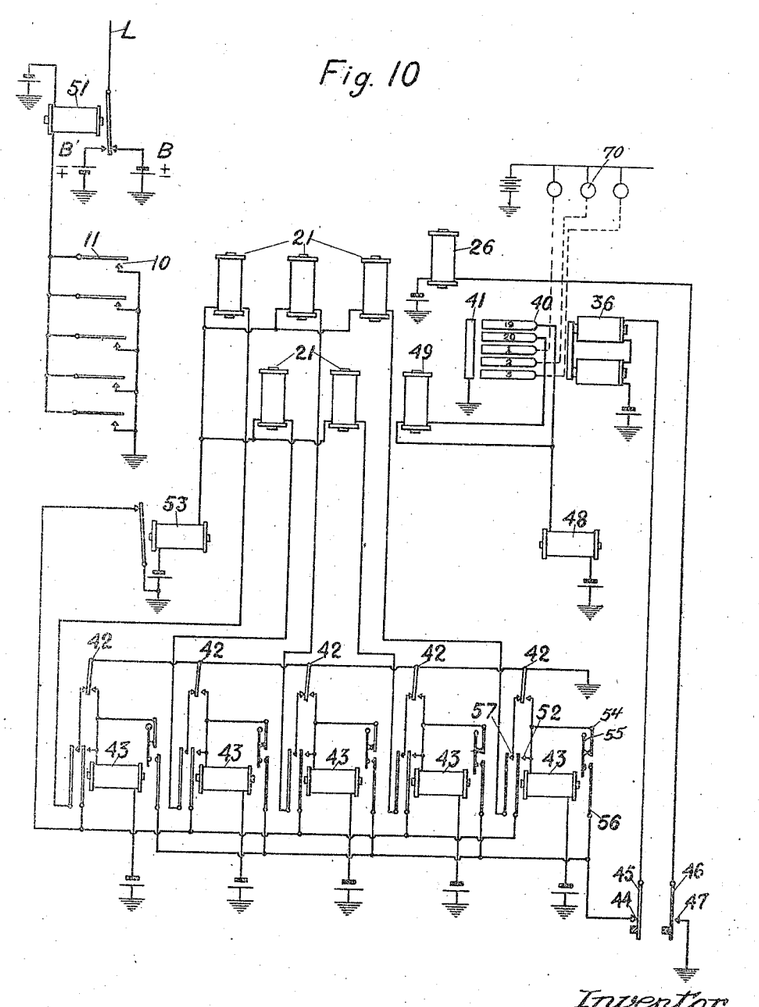
Fig. 10 shows the circuit connections of the signal storer and the keyboard associated therewith.

The keyboard for use with this device comprises five electrical contact springs 42 (Fig. 10), having both front and back contacts, and adapted to be operated in different combinations by each of the keys of the keyboard in known manner. The front contact of each spring 42 is connected to the winding and the back contact to a contact of a relay 43. The keyboard is provided with a canceling key which operates all five springs 42 simultaneously, and at the same time opens the contact between springs 44 and 45 for a purpose to be hereinafter described. The starting key on the keyboard when depressed closes the springs 46 and 47 and mechanically unlocks the remaining keys, which are locked by the energization of a locking magnet 48 in known manner. Also in Fig. 10 is shown a portion of the segments 40 and the slip ring 41 of the commutator device. Contact No. 1 is the contact on which the brush rests when the hammer carriage is de-clutched from the shaft and occupying the idle position as shown in Figs. 1, 2 and 3. Segment No. 20 is connected to battery through the de-clutching magnet 49 and keyboard locking magnet 48 in series, while the segment No. 19 is connected to the key locking magnet 48. The remaining segments may be connected to lamps or other signal devices 70 if desired, so as to indicate to the operator the position of the hammer carriage.

The line wire is connected to the armature of a relay 51, the normal contact of which is connected to the positive terminal of an earthed battery B, while its front contact is connected to the negative terminal of an earthed battery B¹. The relay 51 is adapted to be energized by the engagement of any of the contact springs 11 and screws 10 in the transmitter.

This transmitter is adapted to be used in connection with any suitable receiving apparatus and distributer which may be driven in synchronism with the transmitter by well known means. At the beginning of a message, as previously stated, the disks 6 and 7 are rotating continuously, and the hammer carriage is resting in the position shown in Fig. 3. On the pressing of the starting button the keys of the keyboard are unlocked and the circuit of the starting magnet 26 of the transmitter is closed at the springs 46 and 47. The magnet 26 releases the pin 25 and permits the hammer carriage to rotate about a quarter of a revolution backward or until the pawl 27 disengages itself from the guide plate 39 and slips into engagement with the scape ring. The hammer carriage now begins to rotate forward with the pin disks. Upon the operation of one or more of the character keys of the keyboard, one or more of the springs 42 are operated, each one closing a circuit from earth through its front contact and corresponding relay 43 to battery. The relay 43 on energizing closes a locking circuit for itself through its contact 52 and the contact of relay 53, and during its energization since spring 56 must engage spring 55 before the latter is pressed away from spring 54 transmits a momentary impulse from battery through the front contact of spring 42, make-before-break springs 54, 55 and 56, springs 44 and 45 and escapement magnet 36. The magnet 36 on energizing and deënergizing permits the scape ring 27 and hammer carriage to step back one more step to a new set of pins. On the release of the key the spring (or springs) 42 which was operated, on engaging its back contact as shown in Fig. 10, completes a circuit through the contact 57 of the locked relay 43, its corresponding hammer magnet 21 and relay 53. The relay 53 on operating unlocks all the relays 43 which are in an energized position. The number of the magnets 21 which are engaged depend on the number of springs 42 which are operated by the key pressed. Each magnet 21 on energizing shifts one of the pins 8 from the position 8ª to position 8ᵇ. It will be noted that the five pins which are opposite the setting hammers in any given positions of the carriage are situated in different circular rows as well as in different radial rows and the arms 9 are so spaced that these five pins pass their respective springs 11 one after the other in succession. Each pin passes its spring at the instant that the receiving distributer connects a corresponding receiving device to the line at the receiving end and if the pin is in normal position, the relay 51 is not operated and the receiver receives a positive impulse. If, however, the pin is in its operated position as it passes the spring 11, the relay 51 is operated and the receiver receives a negative impulse. The reason the five pins that are opposite the hammers in each position are in different radial rows, instead of in the same row, is to simplify the construction of the hammers and arms 9 and prevent the congestion of apparatus that would be necessary if the hammers were all arranged along a radial line. It will be noted that the transmitting position of the pins is approximately a quarter of a revolution in advance of the position in which the hammers are first clutched with the shaft. This provides for the keyboard being operated at a slightly slower speed than that at which the characters are transmitted. In practice however, it is found that the keyboard is generally operated at a faster rate than the characters are transmitted. In this case the hammer carriage will be stepped back by the magnet 36 faster than it is advanced by the shaft. This can take place, however, without interference unless the operator gets so far ahead of the transmitter that the hammers are rotated backward almost to the normal position when the brush on the commutator device will engage segment No. 19 and close the circuit of the keyboard locking magnet 48 and prevent the further operation of the keys. After a few characters have been transmitted, the keyboard may be unlocked by the depression of the starting key and the message proceeded with.

If on account of the keys being operated slower than the rate of transmission or at the end of the message the hammers advance with the shaft to a position one step beyond their normal resting position, the brush of the commutator device engages the segment No. 20 which energizes the keyboard locking magnet 48 and de-clutching magnet 49. The magnet 49 withdraws the pawl 37 from the scape ring 27 and as the locking pin 25 in the gear wheel 24 is now a short distance in advance of the armature lever of the starting magnet 26, the hammer carriage drops back a short distance and is brought to rest by the engagement of the pin 25 with the lever of magnet 26 with the commutator brush on segment No. 1 and the pawl 37 on the left hand side of guide plate 39. It is now necessary to press the starting key again before proceeding.

From the above description it will be noted that the setting hammers are advanced from one set of pins to the next on the depression of a key, and the pins are set by the hammers on the release of the key. This provides for canceling the setting of the pins set by the last key in case of error. To cancel an error the canceling key in the keyboard is pressed. This energizes all five of the hammer magnets but opens the circuit of the escapement magnet 36 at springs 44 and 45. This prevents the hammers being stepped back and, consequently, all five pins of the group which were erroneously set are shifted to their alternate position so that when they reach the transmitting position, five negative impulses will be transmitted, and it is usual to arrange the receiver so that five impulses of the same polarity do not print a character.

Figure 11:
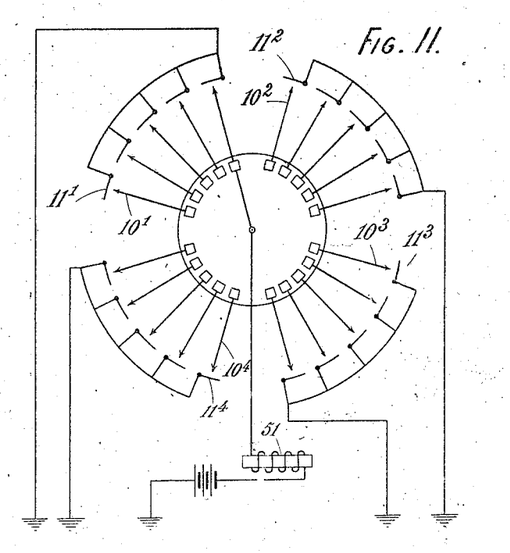
Fig. 11 is a diagrammatic representation of an arrangement of the invention suitable for working with a distributer and a plurality of transmitters.

It will be evident that a plurality of transmitters may be connected up with a distributer of known type in such a way that the impulses from the different ones are sent to line in succession and thereby provide for the transmission of several messages simultaneously. In Fig. 11 the sets of springs of four transmitters are shown diagrammatically at $10^1$, $11^1$, $10^2$, $11^2$, $10^3$, $11^3$, $10^4$, $11^4$, and any of these four sets of springs may be closed by the operation of the pins 8, as before described, to connect the several springs 10 to earth. The rotating brush arm of the distributer, upon engaging the contacts connected to these earthed springs, would send impulses of current to line in succession, which would energize the line relay 51 a corresponding number of times to operate the apparatus associated therewith in the manner described.

Figure 12:
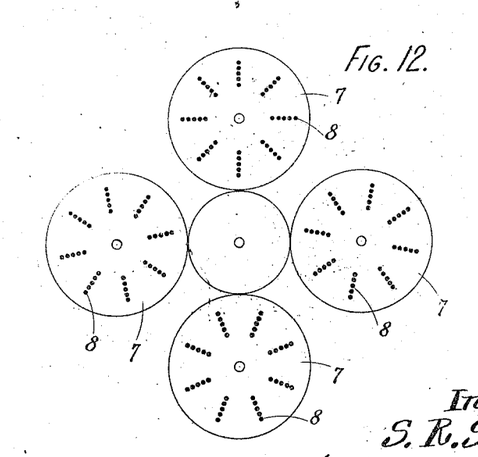
Fig. 12 is a diagrammatic representation of the invention in which a number of transmitters may be driven from a common shaft.

Further, it will be evident that if the group of pins in the transmitter are a sufficient distance apart and the disks of the different transmitters driven at the same speed, but slightly out of phase with each other, the impulses from a plurality of different transmitters may be delivered in regular succession without the use of a separate distributer. This arrangement is shown diagrammatically in Fig. 12 in which four transmitters are driven from a common shaft, the disks 7, of which transmitters, are so set that the pins 8 cause impulses to be sent to line in succession and the distributer at the receiving end of the line would be arranged to connect the line in succession to four receivers. In this way four or other number of messages may be transmitted simultaneously.

In printing telegraph systems of the type referred to herein, it is the usual practice to maintain synchronism between the sending and receiving apparatus by means of correction currents sent out from the sending station at regular intervals. The usual practice in a four channel circuit, for example, is to divide the time of the complete cycle into twenty-four equal parts, of which twenty are utilized for actually transmitting signals (four groups of five each) and the remaining four are used to send out correcting currents for correcting the position of the brushes of the receiving distributer. This may be done with the transmitter described herein by fitting its disk with suitable pins to engage with a spring and send out the correcting currents, which usually comprise two positive and two negative impulses, after each set of signal impulses has been completed. In multiple channel working only one of the transmitters would need to be fitted with these extra pins for sending the correcting impulses. Other known methods of maintaining synchronism may also be employed.

While one particular embodiment of the invention and controlling circuit are shown herein, it is to be understood that the general principles of the invention are not confined to the specific construction shown, but certain modifications may be made therein by those skilled in the art without departing from the spirit of the invention.

What I claim and desire to secure by Letters Patent is:—

1. For a telegraph system, a signal storing and transmitting device comprising pins which are set so as to determine the letter transmitted and a device for setting the pins which is moved after the setting of each pin or group of pins, which determines the transmission of a letter, to the next pin or group of pins to set up the next letter.

2. For a telegraph system, a signal storing and transmitting device comprising pins which are set up so as to determine the letter transmitted and a device for setting the pins which is moved after the setting of each pin or group of pins, which determines the transmission of a letter, to the next pin or group of pins to set up the next letter, said pins being arranged on one or more closed curves and means for moving the part of the setting device which operates the pins in a closed curve.

3. For a telegraph system, a signal storing and transmitting device comprising pins which are set so as to determine the letter transmitted and a device for setting the pins which is moved after the setting of each pin or group of pins, which determines the transmission of a letter, to the next pin or group of pins to set up the next letter, contact springs and a carrier for said pins together with means for moving said carrier to cause the pins to engage the contact springs to determine the letter to be transmitted.

4. For a telegraph system a signal storing and transmitting device comprising pins which are set so as to determine the letter to be transmitted, a rotatable carrier for said pins, a device for setting the pins, means for moving said last named device with said carrier and for shifting it from one group of pins to the next after each setting operation.

5. For a telegraph system, a signal storing and transmitting device as claimed in any of the preceding claims and in which the pins are arranged on a rotatable carrier and in which stationary electromagnets are arranged to operate to set the pins, the number of electromagnets being the same as the maximum number of pins which it may be required to set for the transmission of a letter, and stationary electromagnets arranged to determine the setting of said pins.

6. For a telegraph system, a signal storing and transmitting device comprising pins which are set so as to determine the letter transmitted and a device for setting the pins which is moved after the setting of each pin or group of pins, which determines the transmission of a letter, to the next pin or group of pins to set up the next letter, said pins being arranged to send impulses successively for the transmission of each letter.

7. For a telegraph system, a signal storing and transmitting device comprising a carrier carrying a plurality of groups of pins, each letter being set up by setting the pins in a group, the pins determining the transmission of the signals by being moved to engage electric contacts, and a device for moving the pins to set them up, which device is moved step-by-step from one group of pins to the next after each letter is set up.

8. For a telegraph system, a signal storing and transmitting device, the signal storing device comprising a carrier carrying a number of groups of pins which can be set to determine the letter to be transmitted, movable setting members adapted to set the pins in a group, the movable setting members being carried in a carriage which is moved after the setting-up of each letter to be ready to engage the next group of pins, the transmission of the signals being effected by moving the carrier for the groups of pins so as to cause them to engage electric contact.

9. For a telegraph system, a signal storing and transmitting device comprising a plurality of pins carried in a rotatable carrier and adapted to be set so as to transmit the signals by engaging stationary contact springs, setting members mounted in a rotatable carriage which can rotate with the rotatable pin carrier but which is rotated in the opposite direction to the direction of rotation of the pin carrier on the setting up of each letter so as to be ready to set the pins in the next group.

10. For a telegraph system storing and transmitting device comprising a disk mounted on a rotatable shaft, pins mounted in said disk with their axes parallel to the axis of the shaft and movable parallel to said axis, hammers carried in a frame on said shaft and movable parallel to said shaft, said hammers being moved by the engagement of the armatures of electromagnets, each of said armatures being adapted to move one of said hamers.

11. For a telegraph system a signal storing and transmitting device comprising a disk mounted on a rotatable shaft, pins mounted in said disk with their axes parallel to the axis of the shaft and movable parallel to said axis, hammers carried in a frame on said shaft and movable parallel to said shaft, said hammers being moved by the engagement of the armatures of electromagnets, each of said armatures being adapted to move one of said hammers, a clutch and ratchet mechanism whereby the hammer frame is clutched with the shaft so as to rotate with the disk but allows of relative movement of the hammer carriage with respect to the disk.

12. For a telegraph system, a signal storing and transmitting device comprising a carrier carrying a plurality of groups of pins, each letter being set up by setting pins in a group, the pins determining the transmission of the signals by being moved to engage electric contacts, and a device for moving the pins to set them up, which device is moved step-by-step from one group of pins to the next after each letter is set up, keys for controlling the setting of the pins comprising a canceling key and means to prevent the setting device moving from one group of pins to another when the canceling key is operated.

13. For a telegraph system a plurality of signal storing and transmitting devices, each comprising a plurality of sets of pins carried by a rotary carrier, means for setting said pins and means for rotating all said pin carriers at the same speed but out of phase with each other so as to allow of multiple channel working.

14. For a telegraph system a plurality of signal storing and transmitting devices, each comprising a plurality of sets of pins carried by a rotating carrier, contact springs adapted to be engaged by said pins to transmit impulses, setting hammers for said pins, means for rotating said hammers with said carrier and for stepping them backward from one set of pins to the next between setting operations, and means for rotating all said pin carriers at the same speed but out of phase with each other so as to allow of multiple channel working.

15. For a telegraph system, a plurality of signal storing and transmitting devices comprising pins which are set so as to determine the letter transmitted and a device for setting the pins which is moved after the setting of each pin or group of pins, which determines the transmission of a letter, to the next pin or group of pins to set up the next letter, and means for driving said signal storing and transmitting devices at the same speed but out of phase with each other so as to allow of multiple channel working.

In testimony whereof I have affixed my signature in presence of two witnesses.

SIDNEY REYNELL SMITH.

Witnesses:
    FRANK CHARLES TOMLINS,
    CHARLES EDWARD FOSTER.